United States Patent
Kuo

(10) Patent No.: US 7,123,937 B2
(45) Date of Patent: Oct. 17, 2006

(54) PROGRAMMABLE WIRELESS TRANSCEIVING MODULE

(76) Inventor: Chih-Shan Kuo, 2 Fl., No. 51, Alley 12, Lane 79, Huashiun St., Jungli City, Taoyuan County (TW) 320

( * ) Notice: Subject to any disclaimer, the term of this patent is extended or adjusted under 35 U.S.C. 154(b) by 130 days.

(21) Appl. No.: 10/940,028

(22) Filed: Sep. 14, 2004

(65) Prior Publication Data

US 2006/0003755 A1    Jan. 5, 2006

(30) Foreign Application Priority Data

Jul. 2, 2004    (TW) ............................. 93210454 U

(51) Int. Cl.
*H04B 1/38*    (2006.01)
(52) U.S. Cl. ................ 455/557; 455/552.1; 455/556.1
(58) Field of Classification Search ............... 455/418, 455/552.1, 556.1, 557
See application file for complete search history.

(56) References Cited

U.S. PATENT DOCUMENTS 6,832,729 B1 *   12/2004   Perry et al. ............ 235/472.01

* cited by examiner

*Primary Examiner*—Temica Beamer
(74) *Attorney, Agent, or Firm*—Rosenberg, Klein & Lee

(57) ABSTRACT

A programmable wireless transceiving module applicable to a wireless electronic product comprises a main body, a control unit, a wireless transceiving unit, a programmable memory, and several conducting pins. A circuit board with the control unit thereon is provided in the main body. The control unit is connected to the wireless transceiving unit and the programmable memory. The wireless transceiving unit can use the programmable memory to store programs, and can be connected with other electronic products for signal transmission via the conducting pins. The programmable wireless transceiving module can be used as a terminal product for plug-and-play and an industrial component to support various electronic products requiring the wireless transceiving function, and can reduce the production cost. Users can also freely download digital control programs and data for supporting related electronic products by themselves.

5 Claims, 2 Drawing Sheets

PROGRAMMABLE WIRELESS TRANSCEIVING MODULE

FIELD OF THE INVENTION

The present invention relates to a programmable wireless transceiving module and, more particularly, to a programmable wireless transceiving module having both the characteristics of terminal product and industrial component.

BACKGROUND OF THE INVENTION

Along with technological progress of electronic products, their functions diversify more and more. The wireless transceiving function applicable to electronic products has gradually become inevitable for wireless electronic products.

A wireless transceiving module is generally used on the circuit of an electronic product. Through manual soldering, it is disposed on a printed circuit board (PCB) in an electronic product with the circuit from function test, mechanical assembly, accessory packaging, to product inspection; or it is separately manufactured into an industrial component to endow a related product with the wireless transmission function through industrial processing.

If the wireless transceiving module is disposed on a PCB in an electronic product, there may be large pressure of stocks to cause waste of resources and loss in operation due to product modeling, difference of product types and engineering change. On the other hand, if the wireless transceiving module is separately manufactured into an industrial component, professional production techniques are required to accomplish the wireless transmission function, hence greatly increasing the manufacturing cost and the lead time and thus turning down the business competition.

Accordingly, the present invention aims to provide a programmable wireless transceiving module to enhance competition in the industry and solve the above problem in the prior art.

SUMMARY OF THE INVENTION

An object of the present invention is to provide a programmable wireless transceiving module having both the characteristics of terminal product and industrial component. When used as a terminal product, the plug-and-play function can be exploited separately to achieve connection with other electronic products having the wireless transceiving function. When used as an industrial component, the programmable wireless transceiving module can be directly connected with terminals of any other type electronic products via preserved interface contacts to accomplish wireless transceiving actions of digital data or sound without extra professional processing, assembly and test.

Another object of the present invention is to provide a programmable wireless transceiving module so that users can access related drivers or control codes from websites by themselves to apply the programmable wireless transceiving module to different wireless electronic products.

To achieve the above objects, the present invention provides a programmable wireless transceiving module, which comprises a main body, a control unit, a wireless transceiving unit, a programmable memory, and several conducting pins. A circuit board with the control unit thereon is provided in the main body. The control unit is connected to the wireless transceiving unit and the programmable memory. The wireless transceiving unit can use the programmable memory to store programs, and can be connected with other electronic products for signal transmission via the conducting pins.

The various objects and advantages of the present invention will be more readily understood from the following detailed description when read in conjunction with the appended drawings, in which:

DETAILED DESCRIPTION OF THE PREFERRED EMBODIMENTS

The present invention proposes a programmable wireless transceiving module having both the characteristics of terminal product and industrial component. The programmable wireless transceiving module can apply to an ordinary electronic product like a USB dongles, a headset, a carkit, a mouse, and a wireless adaptor, and can further be widely used in 3C electric appliances and remote controllers.

Figure 1:
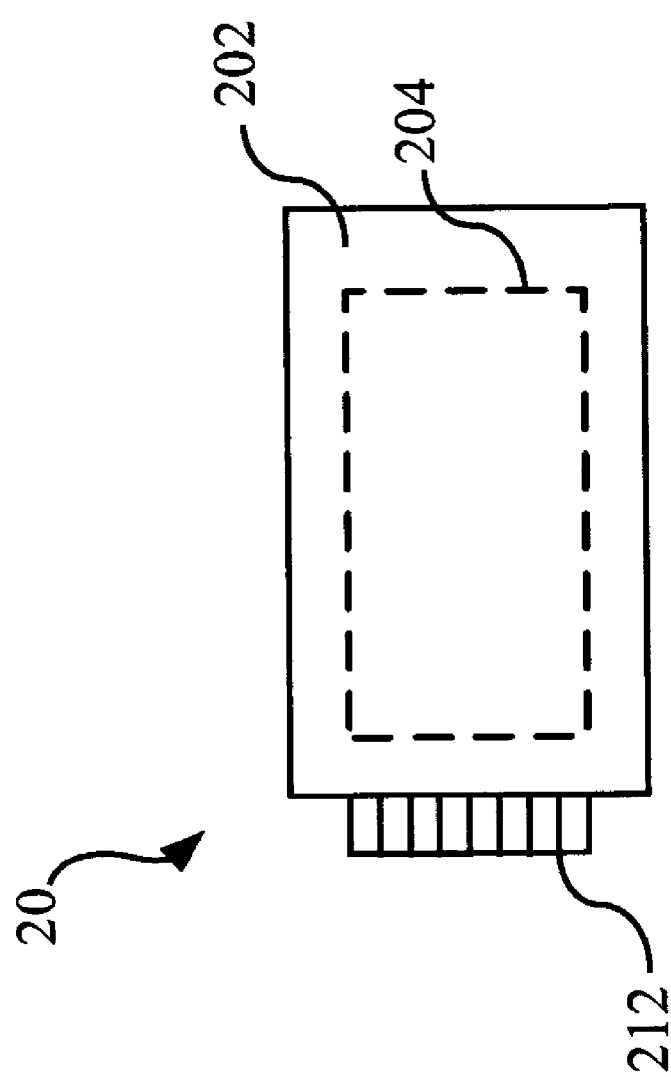
FIG. 1 is a perspective view of the present invention.
Figure 2:
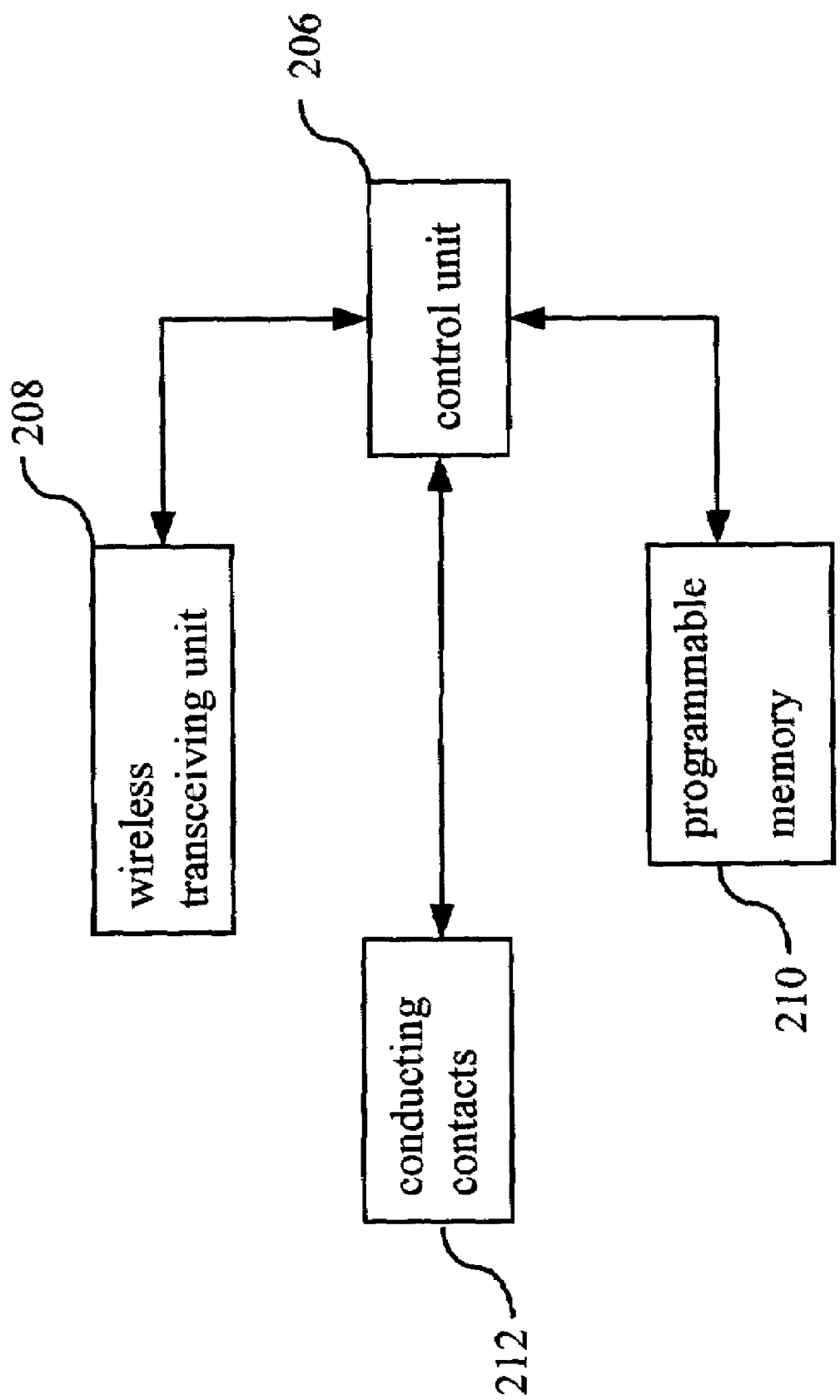
FIG. 2 is a circuit block diagram of the present invention.

Please refer to FIG. 1 as well as FIG. 2. A programmable wireless transceiving module 20 comprises a main body 202 with a user interface provided thereon for convenient operations of users. Pads of related control interfaces like programming interfaces (PI), IO interfaces, decoding and encoding interfaces, RS232 interfaces (UART) and USB interfaces are preserved on the main body 202. A circuit board 204 like a printed circuit board (PCB) is disposed in the main body 202. A control unit 206, a wireless transceiving unit 208 which is a bluetooth transceiving module, and a programmable memory 210 are disposed on the circuit board 204. The programmable memory 210 is usually an electrically erasable programmable read only memory (EEPROM) or a flash memory. The control unit 206 is connected to the wireless transceiving unit 208 and the programmable memory 210. The wireless transceiving unit 208 is controlled by the control unit 206 for download of programs required by electronic products so that users can download for upgrade of programs by themselves and transceiving actions of the electronic products can be accomplished. The programmable memory 210 can store the programs downloaded by the wireless transceiving unit 208. Several conducting contacts 212 are disposed on the circuit board 204. The conducting contacts 212 are connected to the control unit 206, and are exposed out of the main body 202 to be used as connection interfaces.

When the programmable wireless transceiving module 20 is used independently, the conducting contacts 212 on the PCB are used for direct connection with a USB terminal of a computer for wireless transmission of digital information or sound signals. That is, the main body 202 is directly connected with a USB connection terminal of a computer via the conducting contacts 212.

When the main body 202 is used as a wireless transceiving unit of another electronic product, it can be used for direct download of related digital programs or control codes supporting electronic products via the conducting contacts 212 through a personal computer. The programs can be stored in the programmable memory 210. The product of the present invention can be used to support related electronic products via the conducting contacts to accomplish the object of wireless transmission.

A PCB with circuits required by several electronic products thereon is disposed in the electronic product. In addition to being used independently for connection with any electronic product, the programmable wireless transceiving module 20 can also be installed on a PCB of an electronic product. The wireless transceiving module is together manufactured on the PCB and connected with other circuits in the prior art instead. Therefore, if the programmable wireless transceiving module 20 is damaged, it is only necessary to replace a new programmable transceiving module 20 instead of the whole PCB in the prior art, hence reducing the cost.

To sum up, the present invention makes use of a built-in EEPROM having the programmable function to accomplish download of programs required by an electronic product, the plug-and-play function, and mass production. It is only necessary to use a programmable wireless transceiving module to apply to various electronic products requiring the wireless transceiving function. In addition to being used independently for connection with other electronic products, the programmable wireless transceiving module of the present invention can also be installed on a PCB in an electronic product. If the wireless transceiving module is damaged, it is only necessary to replace a new wireless transceiving module instead of the whole PCB in the prior art, hence lowering the cost.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A programmable wireless transceiving module applicable to a plurality of electronic products, comprising:
    a main body having a single circuit board disposed therein, said circuit board having several metal contacts provided thereon;
    a control unit disposed in said main body and located on said circuit board;
    several conducting pins disposed on said circuit board and connected with said control unit via said metal contacts, said conducting pins being exposed out of said main body for selective connection to mating contacts of one of said plurality of electronic products for signal transmission therebetween;
    a wireless transceiving unit disposed on said circuit board and connected to said control unit, said wireless transceiving unit being controlled by said control unit for providing wireless transmission of said one electronic product to transmit and receive digital data or sound, said wireless transceiving unit also providing download of related programs required by said electronic product; and
    a programmable memory disposed on said circuit board and connected to said control unit for use in storing and decoding related application programs and control codes.

2. The programmable wireless transceiving module as claimed in claim 1, wherein said circuit board functions as a bluetooth transceiving module for said one electronic product.

3. The programmable wireless transceiving module as claimed in claim 1, wherein said programmable memory is an electronic erasable programmable read only memory or a flash memory.

4. The programmable wireless transceiving module as claimed in claim 1, wherein said one of said plurality of electronic products includes a USB dongle, a headset, a carkit, a mouse, a remote controller, or a wireless adaptor.

5. The programmable wireless transceiving module as claimed in claim 1, wherein said main body is disposed in said one electronic product.

* * * * *